United States Patent
Lee

(10) Patent No.: US 7,468,096 B2
(45) Date of Patent: Dec. 23, 2008

(54) APPARATUS FOR PRODUCING OXYGEN AND METHOD FOR CONTROLLING THE SAME

(75) Inventor: Chang-Ha Lee, Seoul (KR)

(73) Assignees: Yonsei University, Seoul (KR); Daesung Industrial Gases Co., Ltd., Seoul (KR)

(*) Notice: Subject to any disclaimer, the term of this patent is extended or adjusted under 35 U.S.C. 154(b) by 313 days.

(21) Appl. No.: 10/548,370

(22) PCT Filed: May 20, 2004

(86) PCT No.: PCT/KR2004/001209

§ 371 (c)(1),
(2), (4) Date: Sep. 7, 2005

(87) PCT Pub. No.: WO2004/103899

PCT Pub. Date: Dec. 2, 2004

(65) Prior Publication Data

US 2006/0162565 A1    Jul. 27, 2006

(30) Foreign Application Priority Data

May 23, 2003    (KR)    ............... 10-2003-0032804

(51) Int. Cl.
*B01D 53/04*    (2006.01)
*C01B 13/02*    (2006.01)

(52) U.S. Cl. .............. 95/95; 95/102; 95/130; 95/138; 95/903; 96/132

(58) Field of Classification Search ............. 96/121, 96/130, 132, 133; 95/96, 98, 100–102, 105, 95/130, 138, 903; 128/204.18, 205.12
See application file for complete search history.

(56) References Cited

U.S. PATENT DOCUMENTS

| | | | | |
|---|---|---|---|---|
| 4,190,424 A | * | 2/1980 | Armond et al. | 95/98 |
| 4,386,945 A | * | 6/1983 | Gardner | 95/98 |
| 4,566,881 A | * | 1/1986 | Richter et al. | 95/98 |

(Continued)

FOREIGN PATENT DOCUMENTS

EP    0 856 348 A2    8/1998

(Continued)

*Primary Examiner*—Frank M Lawrence
(74) *Attorney, Agent, or Firm*—Peter F. Corless

(57) ABSTRACT

The present invention concerns the apparatus for producing oxygen, comprising: a first zeolite bed connected to an external air pressurizing device and a depressurizing device for increasing or decreasing an internal pressure thereof; a second zeolite bed connected to the first zeolite bed in parallel and connected to the external air pressurizing device and the depressurizing device for decreasing or increasing an internal pressure thereof, the first and second zeolite beds being arranged such that the internal pressure of the second zeolite bed is decreased when the internal pressure of the first zeolite bed is increased, and the internal pressure of the second zeolite bed is increased when the internal pressure of the first zeolite bed is decreased; and a carbon molecular sieve bed communicated in fluid with the first and second zeolite beds for receiving and adsorbing oxygen produced in the first and second zeolite beds and discharging the produced oxygen to the outside and discharging selectively some of the produced oxygen to the first zeolite bed or the second zeolite bed.

7 Claims, 1 Drawing Sheet

U.S. PATENT DOCUMENTS

| | | | |
|---|---|---|---|
| 4,661,125 A | * | 4/1987 | Haruna et al. .................. 95/102 |
| 4,848,985 A | * | 7/1989 | Sadkowski .................... 95/100 |
| 4,880,443 A | * | 11/1989 | Miller et al. ................... 95/98 |
| 4,985,052 A | * | 1/1991 | Haruna et al. .................. 95/101 |
| 5,906,674 A | * | 5/1999 | Tan et al. ....................... 95/98 |
| 6,277,174 B1 | | 8/2001 | Neu et al. |
| 6,475,265 B1 | | 11/2002 | Baksh et al. |

FOREIGN PATENT DOCUMENTS

| EP | 0 914 857 A1 | 5/1999 |
|---|---|---|
| JP | 8-301603 | 11/1996 |

* cited by examiner

APPARATUS FOR PRODUCING OXYGEN AND METHOD FOR CONTROLLING THE SAME

TECHNICAL FIELD

The present invention relates to an apparatus for producing oxygen and a method for controlling the same. Specifically, the present invention relates to an apparatus for producing oxygen which is consisted of a zeolite bed system and a carbon molecular sieve bed system, and which is controlled to selectively produce highly pure oxygen gas when necessary, and to a method for controlling the same.

BACKGROUND ART

A general method to separate oxygen in air is the cryogenic distillation method which rapidly decreases the temperature of air at room temperature to liquefy air, and separates oxygen therefrom by distillation.

However, the cryogenic distillation method is disadvantageous in that an excessively large amount of cost is required for purchasing and installing apparatuses since a large sized-coding apparatus for rapid coding air and a large sized-distillation bed for distilling the coded air should be provided.

Comparing the cryogenic distillation method with the adsorption methods, the cryogenic distillation method has a drawback in that much more costs are required, but nevertheless is preferred to the adsorption method since it also has an advantage that oxygen having a high purity of 99% or more can be produced. Due to the massive equipment and huge investment cost, however, it is almost impossible for small and medium scales to employ such equipments.

Thus, a main method currently used is the adsorption method to separate elements by using a solid on which micro pores corresponding to a bulk of specific elements in air are formed. Zeolite is mainly used as adsorbent in the adsorption method because zeolite acts as strong adsorbent against nitrogen and as weak adsorbent against oxygen.

Therefore, once air is supplied to zeolite, nitrogen is adsorbed into the zeolite and oxygen is transmitted and discharged, thereby producing oxygen with nitrogen remarkably excluded. At this time, thus produced oxygen includes a very little amount of nitrogen which are not removed from the zeolite and argon which is not adsorbed due to its adsorptability similar to oxygen.

Accordingly, the oxygen production system utilizing the conventional adsorption method is consisted of a zeolite bed having an inner space filled with zeolite. In a case, two to four of zeolite beds are used in order to raise the purity of oxygen.

However, oxygen produced by the above adsorption-type oxygen production system has the maximum purity of 95% only due to difficulty of separating argon. Thus, oxygen manufacturers have developed a process for producing oxygen having a high purity of 99% or more with using the above system since 1980s.

And, at present, BOC and Crew Technology Division Amstrong Rabortory Co., Ltd. of the United State of America and Suminoto Seike Co., Ltd of Japan distinguished themselves as the leading companies in the industry field, and they are planning to commercialize a system which can produce oxygen having the high impurity of 99.7%.

However, the oxygen production systems provided in these makers comprises an adsorption process for separating bulk and an adsorption process for purification, and once the adsorption process for separating bulk is completely finished, the adsorption process for purification should be performed. Thus, the biggest problem in these systems is that the unit production cost for oxygen is high due to operation of each adsorption process.

On the other hand, nitrogen having high purity can be produced by the adsorption method. In this case, a carbon molecular sieve (CMS) is used as adsorbent because oxygen could be adsorbed at tens to hundreds times higher rate than nitrogen or argon.

That is, due to differences in the adsorption rates to C(4S among oxygen, nitrogen, and argon, oxygen is adsorbed rapidly to CMS, while nitrogen and argon are not adsorbed, and are penetrated through CMS, thereby to produce nitrogen of high purity.

This nitrogen production system employing CMS is generally consisted of a CMS bed filled with (MS. In a case, two to four of CMS beds are used in order to raise the purity and output of nitrogen.

On the other hand, recently, a new process employing the zeolite bed system as described above has been developed to produce oxygen having a purity of 99% or more by first producing oxygen having a high purity of 90~95% with including impurities such as nitrogen and argon, and then filtrating the oxygen under (MS bed system as described above.

However, this process employs a multi-step system in which the zeolite bed system and the CMS bed system are separately provided and independently operated. Accordingly, this system should be equipped with all the individual systems, and also doubled costs for operation and energy should be paid for individual independent operation. Further, the raw material should be passed through the individual systems, and so the recovery rate of oxygen is sharply lowered.

DISCLOSURE OF THE INVENTION

In order to solve problems of the conventional oxygen production methods, the present invention has been developed. One object of the present invention is to provide an apparatus for producing oxygen and a method for controlling the same which performs in turn a pressurizing step and a depressurizing regeneration step for the zeolite bed system to produce oxygen continuously from the carbon molecular sieve bed system. In addition, another object of the preset invention is to provide an apparatus for producing oxygen and a method for controlling the same which can adjust selectively the purity of oxygen produced in the carbon molecular sieve bed.

The definitions of terms used in the present specification are as follows;

The term, "bed system," used herein refers to a bed system having one or more beds connected to each other in parallel or in row. Therefore, a zeolite bed system may contain one or more zeolite beds connected to each other in parallel or in row, and a CMS bed system may contain one or more C(MS beds connected to each other in parallel or in row.

The terms, "the first port" and "the second port," used herein refer to a lower or upper portion of the bed, that is, if the first port refers to a lower portion of the bed, the second port indicates an upper portion of the bed.

The term, "pressurizing means" refers to any means which could supply air to the zeolite bed system. The preferable pressurizing means may contain blower and compressor.

The term, "depressurizing means," refers to any means which could decrease or vacuum the internal pressure of a zeolite bed system. The preferable depressurizing means may contain valve and vacuum pump.

The term, "decreasing" or "depressurizing" in "decreasing the internal pressure of a zeolite bed" or "depressurizing regeneration step" means to decrease pressure of a zeolite bed to atmosphere or vacuum.

The apparatus for producing oxygen according to the present invention comprises a zeolite bed system connected to an external air pressurizing means and a external depressurizing means to increase or decrease the internal pressure for producing oxygen; and a carbon molecular sieve bed system adsorbing oxygen generated in the zeolite bed system, supplying oxygen, which is not adsorbed, to the zeolite bed system, and then producing oxygen by decreasing the inner pressure.

Preferably, the carbon molecular sieve bed system of the above apparatus has a port connected in fluid with the zeolite bed system for some of thus produced oxygen to be supplied selectively to the zeolite bed system.

Further, in the above apparatus, the preferable zeolite bed system comprises, a first zeolite bed having a first port connected to the external air pressurizing means and the external depressurizing means for increasing or decreasing the internal pressure thereof;

a second zeolite bed being connected to the first zeolite bed in parallel and having a first port connected to the external air pressurizing means and the external depressurizing means for decreasing or increasing the internal pressure thereof, wherein the internal pressure of the second zeolite bed is decreased when the internal pressure of the first zeolite bed is increased, and the internal pressure of the second zeolite bed is increased when the internal pressure of the first zeolite bed is decreased;

the preferable carbon molecular sieve bed system comprises, a first port connected in fluid with second ports of the first and second zeolite beds for receiving and adsorbing oxygen produced in the first and second zeolite beds;

a second port connected in fluid with the second ports of the first and second zeolite beds for discharging oxygen, which is not adsorbed, to the first and second zeolite beds, wherein the pressure in the carbon molecular sieve bed is decreased to discharge the produced oxygen to the outside via the first port, and the port for discharging the produced oxygen is selectively connected in fluid with the first port of the first or the second zeolite bed to supply additionally some of the produced oxygen to the zeolite bed.

Herein, it is preferable that each of the first ports of the zeolite beds and the carbon molecular sieve bed forms a lower portion of each bed, and each of the second ports of the zeolite beds and the carbon molecular sieve bed forms an upper portion of each bed.

Further, the method for controlling an oxygen production apparatus having a zeolite bed system and a carbon molecular sieve bed system according to the present invention comprises;

the first step of increasing the internal pressure of the zeolite bed system to adsorb nitrogen and to produce oxygen, the second step of supplying oxygen produced in the zeolite bed system to the carbon molecular sieve bed system to increase the pressure in the carbon molecular sieve bed system and to adsorb oxygen;

the third step of supplying oxygen, which is not adsorbed in the carbon molecular sieve bed system, to the zeolite bed system; and the fourth step of discharging oxygen produced in the carbon molecular sieve bed system to an external device by decreasing the internal pressure of the carbon molecular sieve bed system.

It is preferable that the above method further comprises a step of equalizing the internal pressures of beds in the zeolite bed system or the internal pressures of beds in the carbon molecular sieve bed system.

It is also preferable that the above method further comprises a step of supplying selectively oxygen produced initially in the carbon molecular sieve bed system to the zeolite bed system by decreasing the internal pressure of the carbon molecular sieve bed system after the above third step is completed.

Furthermore, the method for controlling this oxygen production apparatus having two zeolite beds and a carbon molecular sieve bed according to the present invention comprises;

the first step of increasing the internal pressure of a first zeolite bed to adsorb nitrogen and to produce oxygen, decreasing the internal pressure of a second zeolite bed to separate and remove nitrogen from an adsorbent therein;

the second step of supplying oxygen produced in the first zeolite bed to a carbon molecular sieve bed to increase the pressure in the carbon molecular sieve bed and to adsorb oxygen;

the third step of supplying oxygen, which is not adsorbed in the carbon molecular sieve bed, to the second zeolite bed;

the fourth step of adjusting the internal pressures of the first and second zeolite beds to a same level;

the fifth step of discharging oxygen produced in the carbon molecular sieve bed to an external device, the first zeolite bed or the second zeolite bed by decreasing the internal pressure of the carbon molecular sieve bed;

the sixth step of increasing the internal pressure of the second zeolite bed to adsorb nitrogen and to produce oxygen, decreasing the internal pressure of the first zeolite bed to separate and remove nitrogen from an adsorbent therein;

the seventh step of supplying oxygen produced in the second zeolite bed to the carbon molecular sieve bed to increase the pressure in the carbon molecular sieve bed and to adsorb oxygen;

the eight step of supplying non-adsorbed in the carbon molecular sieve bed to the first zeolite bed;

the ninth step of equalizing the internal pressures of the first and second zeolite beds; and the tenth step of discharging oxygen produced in the carbon molecular sieve bed to the external device, the first zeolite bed or the second zeolite bed by decreasing the internal pressure of the carbon molecular sieve bed.

Preferably, the above method further comprises a step of supplying selectively oxygen produced initially in the carbon molecular sieve bed system to the zeolite bed system by decreasing the internal pressure of the carbon molecular sieve bed system after the above fourth step is completed.

In the above methods, it is preferable that the average purity of oxygen supplied to the second zeolite bed is 75 to 85% in the third step. The purity of oxygen produced in the zeolite bed may be decreased when the above average purity of oxygen is no more than 75%, and an output of oxygen and efficiency of process may be decreased when the above average purity of oxygen is 85% or more.

Further, in the above method, it is preferable that the oxygen supplied to the zeolite bed is supplied during the initial pressure-reducing step less than 50% of the whole pressure reducing step in the CMS bed system. The output of oxygen and the efficiency of process may be decreased in the CMS bed system if the above process is occurred over 50% from the initial pressure reducing step.

BEST MODE FOR CARRYING OUT THE INVENTION

Figure 1:
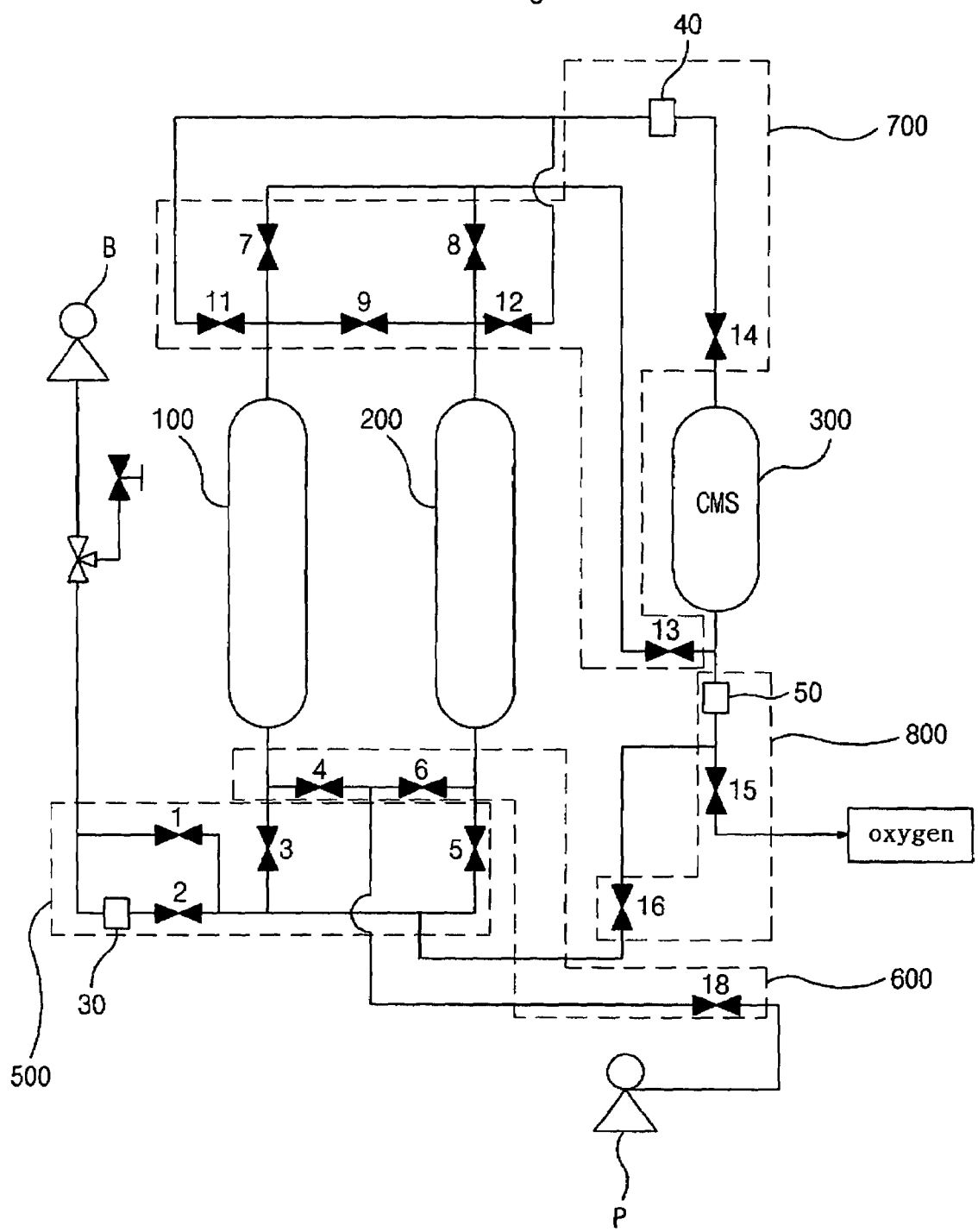
FIG. 1 is a schematic view for showing the structure of the apparatus for producing oxygen according to an embodiment of the present invention.

Hereinafter, an embodiment of the present invention will be described in detail with reference to the accompanying drawing. However, the following embodiment should not be construed as limiting the scope of the present invention in any way.

FIG. 1 is a schematic view for showing the structure of the apparatus for producing oxygen according to an embodiment of the present invention.

An apparatus according to one embodiment of the present invention is consisted of a first and second zeolite beds 100 and 200; a CMS bed 300; a blower B for supplying air to the first or second zeolite bed and pressurizing the bed; a vacuum pump P for evacuating the first or second zeolite bed into vacuum state; and first, second, third, and fourth valve sections 500, 600, 700 and 800.

The first valve section 500 is consisted of valves 1, 2, 3, 5, and a flow control valve 30, and is controlled to supply air from the bower B at a certain pressure to the first zeolite bed 100 or the second zeolite bed 200 to increase the pressure of the bed 100 or 200 to a certain level.

The second valve section 600 is consisted of valves 4, 6 and 18, and is controlled to supply vacuum generated in the vacuum pump P to the first zeolite bed 100 or the second zeolite bed 200 to decrease the pressure in the bed 100 or 200.

The third valve section 700 is consisted of valves 7, 8, 9, 11, 12, 13, 14, and a pressure control valve 40, and is controlled to supply oxygen in the first zeolite bed 100 or the second zeolite bed 200 to the CMS bed 300, to discharge oxygen in the CMS bed in which the pressure is controlled to the first zeolite bed or the second zeoli te bed, or to equalize the pressure in the first and second zeolite beds.

In addition, the fourth valve section 800 is consisted of valves 15, 16, and a pressure regulating valve 50, and is controlled to selectively discharge oxygen in the CMS bed 300.

The control method of the present invention as constructed above will be described in detail below.

In the pressurizing and depressurizing regeneration steps, the pressure in the first zeolite bed 100 or the second zeolite bed 200 is increased by air supplied from the blower B or is decreased to vacuum by the vacuum pump P to regenerate the adsorbent.

First of all, the pressure in the pressurizing step is increased in the first zeolite bed 100, and the pressure in the depressurizing regeneration step is decreased in the second zeolite bed 200. Air of a certain pressure from the blower B is supplied to the first zeolite bed 100 through the valves 1 and 3 which are opened. The pressure in the first zeolite bed 100 is increased by the air supplied up to a certain pressure, and a nitrogen adsorbent in the first zeolite bed adsorbs nitrogen in this pressurization step.

Simultaneously while the valves 6 and 18 are opened, the pressure in the second zeolite bed 200 is decreased by operation of the vacuum pump P to perform an adsorbent regeneration process in which nitrogen is separated from the adsorbent received in the second zeolite bed.

Further, in the step for adsorbing and recovering oxygen, once the pressure in the first zeolite bed 100 is reached a specific level (about 1.5 bar), the valve 1 is shut, and the flow control valve 30 and the valves 7 and 13 are opened. At this time, the flow control valve 30 controls the flow rate of air supplied from the blower B to the first zeolite bed 100 to maintain the flow rate of air in the first zeolite bed 100 constantly. Nitrogen is adsorbed by means of the adsorbent in the first zeolite bed 100 to produce oxygen having a purity of 90~94% and to supply oxygen having a purity of 90~94% to the CMS bed 300 through the valves 7 and 13.

Here, 90~94% oxygen produced in the first zeolite bed 100 pressurizes the inside of the CMS bed 300 thorough the valves 7 and 13, and then the oxygen is adsorbed into the adsorbent in the CMS bed.

At this time, if the pressure in the CMS bed 300 is reached a certain level (about 1~about 3 bar), the valve 14 is opened and about 80% oxygen, which is not adsorbed in the CMS bed 300, is discharged.

Also, while the valves 14 and 12 are opened, the valves 6 and 18 are shut, whereby about 80% oxygen discharged from the CMS bed 300 is supplied to the second zoelite bed 200, and nitrogen is adsorbed and eliminated by the adsorbent in the second zeolite bed.

Here, the pressure control valve 40 controls the pressure of about 80% oxygen discharged through the opened valve 14 to maintain the pressure in the CMS bed 300 at a constant level.

Accordingly, the pressure in the second zeolite bed 200 to which about 80% oxygen is supplied is maintained at a certain level which is remarkably lower than that of the CMS bed 300.

However, if the purity of oxygen discharged from the CMS bed 300 remarkably exceeds about 75~85%, a controler (not shown) determines that the adsorbent in the CMS bed is oversaturated, and is unable to adsorb oxygen any more, and then shuts the opened valves 7, 13, 14 and 12.

At this time, the valves 9 and 15 are opened in the step for equalizing the pressure and the step for producing oxygen. A process for equalizing the pressure in the first and second zeolite beds 100 and 200 is performed through the opened valve 9, and oxygen adsorbed in the CMS bed 300 is produced through the opened valve 15.

Here, a high pressure in the first zeolite bed 100 is supplied to the second zeolite bed 200 which has relatively low pressure through opened valve 9 to pressurize the second zeolite bed.

As described above, due to the process for equalizing the pressure in the first and second zeolite beds 100 and 200 through the opened valve 9, the pressure in the second zeolite bed 200 is increased by the pressure in the first zeolite bed 100 which is increased to a specific level.

At this time, by the process for equalizing the pressure, the pressure in the second zeolite bed 200 is increased to about 60% of the target pressure (about 1.5 bar).

And, in the CMS bed 300, oxygen is adsorbed by the adsorbent. If the valve 15 is opened to decrease the pressure in the CMS bed 300 to atmospheric pressure, oxygen in the adsorbent as well as nitrogen and argon remained between the adsorbents are discharged to produce oxygen having the purity of about 97%.

Prior to opening the valve 15, when oxygen is produced through the CMS bed 300, in a state where the valves 5 and 16 are opened, once an initial step for reducing the pressure in the CMS bed 300 to about 30% is performed by controlling the pressure regulating valve 50 [that is, once the pressure decrease ratio per hour is controlled by opening the pressure regulating valve to reduce the pressure to 30% (wherein 'to reduce a pressure to 100%' means 'to reduce the pressure to the atmosphere pressure')], nitrogen and argon mainly remained between the adsorbents, and oxygen in air are discharged much earlier than oxygen adsorbed to the adsorbent in the CMS bed, due to the pressure difference between the CMS bed and the second zeolite bed.

At this time, where the pressure is decreased to about 30%, oxygen discharged from the CMS bed is supplied to the second zeolite bed 200 through the opened valves 16 and 5, and if the pressure in the CMS bed is decreased to the atmospheric pressure by opening the valve 15 where the valves 16 and 5 are shut, oxygen having the purity of about 99% can be produced.

In short, in the pressure equalizing step and oxygen production step, once the second zeolite bed 200 is pressurized through the process for equalizing the pressure in the first and second zeolite beds, and oxygen having a purity of about 97% or about 99% is produced through the process for producing oxygen in the CMS bed 300, the production of oxygen is completed through the pressurizing step for the first zeolite bed 100 and the depressurizing regeneration step for the second zeolite bed 200.

A method for controlling the depressurizing regeneration step for the first zeolite bed 100 and the pressurizing step for the second zeolite bed 200 is described below. In the pressurizing step and the depressurizing regeneration step, once the valves 9, 15, and 2, 3 are shut while the valves 1 and 5 are opened, the pressurized air in the blower B is supplied to the second zeolite bed 200 to increase the pressure in the second zeolite bed 200 to a certain level.

At this time, the pressure in the second zeolite bed was increased to about 60% of the target pressure through the process for equalizing the pressure between the first and second zeolite beds, and so the time required for increasing the pressure will be remarkably decreased.

Here, once the pressure in the second zeolite bed 200 is reached a certain level, the valve 1 is shut, and at the same time, the flow control valve 30 is opened. The flow control valve 30 controls the flow rate of air supplied from the blower B to the second zeolite bed to maintain the flow rate of air in the second zeolite bed 200 constantly, and by employing the adsorbent, oxygen having a purity of 90~94% is produced in the absorbent in the second zeolite bed 200.

At the same time, the pressure in the first zeolite bed 100 is decreased to vacuum by operation of the vacuum pump P while the valves 4 and 18 are opened, whereby nitrogen is separated and eliminated from the adsorbent in the first zeolite bed to achieve regeneration of the adsorbent.

In the step for adsorbing and recovering oxygen, on the other hand, oxygen having a purity of 90~93% produced in the second zeolite bed 200 is supplied to the CMS bed 300 via the opened valves 8 and 13.

Here, 90~94% oxygen produced in the second zeolite bed 200 pressurizes the inside of the CMS bed 300 through the valves 8 and 13, and then the oxygen is adsorbed into the adsorbent in the CMS bed.

At this time, if the pressure in the CMS bed 300 is reached a certain level (about 1~about 3 bar), the valve 14 is opened and about 80% oxygen, which is not adsorbed in the CMS bed 300, is discharged.

Also, while the valves 14 and 11 are opened, the valves 4 and 18 are shut, whereby about 80% oxygen discharged from the CMS bed 300 is supplied to the first zeolite bed 100 and nitrogen is adsorbed and eliminated by the adsorbent regenerated in the first zeolite bed.

Here, the pressure control valve 40 controls the pressure of about 80% oxygen discharged through the opened valve 14 to maintain the pressure in the CMS bed 300 at a constant level.

Accordingly, the pressure in the first zeolite bed 100 to which about 80% oxygen is supplied is maintained at a certain level which is remarkably lower than that of the CMS bed 300.

However, if the purity of oxygen discharged from the CMS bed 300 exceeds remarkably about 80%, a contrdler (not shown) determines that the adsorbent in the CMS bed is oversaturated, and is unable to adsorb oxygen any more, and shuts the opened valves 8, 13, 14 and 11.

And, in the steps for equalizing the pressure and producing oxygen, the valves 9 and 15 are opened. The process for equalizing the pressure in the first and second zeolite beds 100 and 200 is performed through the opened valve 9, and oxygen adsorbed to the adsorbent in the CMS bed 200 is produced through the opened valve 15.

Here, a high pressure in the second zeolite bed 200 is supplied to the first zeolite bed 100 which has relatively low pressure through opened valve 9 to pressurize the second zeolite bed.

As described above, due to the process for equalizing the pressure in the first and second zeolite beds 100 and 200 through the opened valve 9, the pressure in the first zeolite bed 100 is increased by the pressure in the second zeolite bed 200 increased to a specific level.

At this time, through the process for equalizing the pressure, the pressure in the first zeolite bed is increased to about 60% of the target pressure.

And, in the CMS bed 600, oxygen is adsorbed into the adsorbent. If the valve 15 is opened to decrease the pressure in the CMS bed to the atmospheric pressure, oxygen in the adsorbent as welt as nitrogen and argon remained mainly between the adsorbents are discharged to produce oxygen having the purity of about 97%.

Prior to opening the valve 15, when oxygen is produced through the CMS bed 300, in a state where the valves 3 and 16 are opened, once an initial step for reducing the pressure in the CMS bed 300 to about 30% is performed by controlling the pressure regulating valve 50 [that is, once the pressure decrease ratio per hour is controled by opening the pressure regulating valve to reduce the pressure to 30% (wherein "to reduce the pressure to 100%" means "to reduce the pressure to the atmosphere pressure)]" nitrogen and argon mainly remained between the adsorbents, and oxygen in air are discharged much earlier than oxygen adsorbed to the adsorbent in the CMS bed, due to the pressure difference between the CMS bed and the second zeolite bed.

At this time, where the pressure is decreased to about 30%, oxygen discharged from the CMS bed is supplied to the first zeolite bed 100 through the opened valves 16 and 3, and if the pressure in CMS bed is decreased to the atmospheric pressure by opening the valve 15 where the valves 16 and 3 are shut, oxygen having the purity of about 99% can be produced.

Once the pressure in the first zeolite bed 100 is increased through the process for equilibrating the pressure in the first and second zeolite beds 100 and 20, and oxygen having a purity of about 97% or 99% is produced through the process for producing oxygen in the CMS bed 300, the production of oxygen through the second zeolite bed 100 is completed.

In the present invention, while the pressure-increasing or pressure-reducing regeneration processes for the first and second zeolite beds 100 and 200 are performed in turn, oxygen can be continuously produced in the CMS bed 300.

Therefore, a technical feature of the present invention is that oxygen having high purity can be selectively produced in the CMS bed when necessary.

INDUSTRIAL APPLICABILITY

The present invention is characterized in that the structure is simple, the recovery ratio is very high, and oxygen having high purity can be selectively produced through the simple control step when necessary.

The invention claimed is:

1. An apparatus for producing oxygen, comprising:
a first zeolite bed connected to an external air pressurizing means and a depressurizing means for increasing or decreasing an internal pressure thereof;
a second zeolite bed connected to the first zeolite bed in parallel and connected to the external air pressurizing means and the depressurizing means for decreasing or increasing an internal pressure thereof, the first and second zeolite beds being arranged such that the internal pressure of the second zeolite bed is decreased when the internal pressure of the first zeolite bed is increased, and the internal pressure of the second zeolite bed is increased when the internal pressure of the first zeolite bed is decreased;
a carbon molecular sieve bed communicated in fluid with the first and second zeolite beds for receiving and adsorbing oxygen produced in the first and second zeolite beds and discharging the produced oxygen to the outside and discharging selectively some of the produced oxygen to the first zeolite bed or the second zeolite bed;
a first valve section for supplying air from the external air pressurizing means to the first zeolite bed or the second zeolite bed;
a second valve section for supplying vacuum from the air depressurizing means to the first zeolite bed or the second zeolite bed;
a third valve section connected to the first and second zeolite beds and the carbon molecular bed for supplying oxygen generated in the first zeolite bed or the second zeolite bed to the carbon molecular sieve bed, discharging non-adsorbed oxygen in the carbon molecular bed to the first zeolite bed or the second zeolite bed, and equalizing the pressure in the first and second zeolite beds; and
a fourth valve section connected to the carbon molecular sieve bed, an external device and the first and second zeolite beds for discharging selectively oxygen generated in the carbon molecular bed to the external device, the first zeolite bed or the second zeolite bed.

2. The apparatus for producing oxygen according to claim 1, wherein the first and second zeolite beds include first ports connected to the external air pressurizing means and the depressurizing means, and the carbon molecular sieve bed includes a first port communicated in fluid with second ports of the first and second zeolite beds for receiving and adsorbing oxygen produced in the first and second zeolite beds and a second port communicated in fluid with the second ports of the first and second zeolite beds for discharging selectively non-adsorbed oxygen into the first zeolite bed or the second zeolite bed.

3. The apparatus for producing oxygen according to claim 2, wherein each of the first ports of the zeolite beds and the carbon molecular sieve bed forms a lower portion of each bed, each of the second ports of the zeolite beds and the carbon molecular sieve bed forms an upper portion of each bed.

4. A method for controlling an oxygen production apparatus having two zeolite beds and a carbon molecular sieve bed, comprising;
the first step of increasing the internal pressure of a first zeolite bed to adsorb nitrogen and to produce oxygen, decreasing the internal pressure of a second zeolite bed to separate and remove nitrogen from an adsorbent therein;
the second step of supplying oxygen produced in the first zeolite bed to a carbon molecular sieve bed to increase the pressure in the carbon molecular sieve bed and to adsorb oxygen;
the third step of supplying non-adsorbed oxygen in the carbon molecular sieve bed, to the second zeolite bed;
the fourth step of equalizing the internal pressures of the first and second zeolite beds;
the fifth step of discharging oxygen produced in the carbon molecular sieve bed to an external device, the first zeolite bed or the second zeolite bed by decreasing the internal pressure of the carbon molecular sieve bed;
the sixth step of increasing the internal pressure of the second zeolite bed to adsorb nitrogen and to produce oxygen, decreasing the internal pressure of the first zeolite bed to separate and remove nitrogen from an adsorbent therein;
the seventh step of supplying oxygen produced in the second zeolite bed to the carbon molecular sieve bed to increase the pressure in the carbon molecular sieve bed and to adsorb oxygen;
the eighth step of supplying non-adsorbed in the carbon molecular sieve bed to the first zeolite bed;
the ninth step of equalizing the internal pressures of the first and second zeolite beds; and
the tenth step of discharging oxygen produced in the carbon molecular sieve bed to the external device, the first zeolite bed or the second zeolite bed by decreasing the internal pressure of the carbon molecular sieve bed.

5. The method according to claim 4, further comprising a step of supplying selectively oxygen produced initially in the carbon molecular sieve bed to the second zeolite bed by decreasing the internal pressure of the carbon molecular sieve bed after the above fourth step is completed.

6. The method according to claim 4 wherein, in the third step, the average purity of oxygen supplied to the first zeolite bed or the second zeolite bed is 75 to 85%.

7. The method according to claim 5, wherein oxygen supplied to the first zeolite bed or second zeolite bed is supplied during the initial pressure-reducing step less than 50% of the whole pressure reducing step in the molecular sieve bed.

* * * * *